United States Patent
Okamoto et al.

(10) Patent No.: US 10,639,962 B2
(45) Date of Patent: May 5, 2020

(54) AIR-CONDITIONER FOR VEHICLE

(71) Applicant: DENSO CORPORATION, Kariya, Aichi-pref. (JP)

(72) Inventors: Tsuyoshi Okamoto, Kariya (JP); Takayuki Watanabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/073,600

(22) PCT Filed: Feb. 1, 2017

(86) PCT No.: PCT/JP2017/003618
§ 371 (c)(1),
(2) Date: Jul. 27, 2018

(87) PCT Pub. No.: WO2017/135307
PCT Pub. Date: Aug. 10, 2017

(65) Prior Publication Data
US 2019/0030990 A1  Jan. 31, 2019

(30) Foreign Application Priority Data

Feb. 2, 2016 (JP) .................. 2016-018401

(51) Int. Cl.
*B60H 1/03* (2006.01)
*F01P 3/20* (2006.01)
(Continued)

(52) U.S. Cl.
CPC .......... *B60H 1/034* (2013.01); *B60H 1/3208* (2013.01); *B60H 1/3213* (2013.01);
(Continued)

(58) Field of Classification Search
CPC .. B60H 1/034; B60H 1/32281; B60H 1/3213; B60H 1/3208; B60H 2001/3266;
(Continued)

(56) References Cited

U.S. PATENT DOCUMENTS

2008/0041071 A1  2/2008 Itoh
2014/0318170 A1* 10/2014 Katoh ...................... F28F 9/26
  62/324.5
(Continued)

FOREIGN PATENT DOCUMENTS

| JP | H10-203145 A | 8/1998 |
| JP | 2007-283830 A | 11/2007 |

OTHER PUBLICATIONS

Machine translation, JPH10-203145A, Matsuno et al., publ'n date: Aug. 4, 1998, obtained from https://worldwide.espacenet.com/, pp. 1-16. (Year: 1998).*

(Continued)

*Primary Examiner* — Grant Moubry
(74) *Attorney, Agent, or Firm* — Oliff PLC

(57) ABSTRACT

A heat pump and a heater core are provided at a heating coolant water circuit connected to an engine. As heating thermal amount control, the control of decreasing the output of the heat pump and increasing the output of the engine with an increase in an engine outlet water temperature detected by an engine outlet water temperature sensor, thereby ensuring a target heating thermal amount. Thus, in response to a decrease in a heat generation efficiency of the heat pump with an increase in the engine outlet water temperature, the output of the heat pump is decreased so that fuel economy can be improved while the output of the engine is increased so that the target heating thermal amount can be ensured.

5 Claims, 14 Drawing Sheets

(51) Int. Cl.
*F01P 11/16* (2006.01)
*F02D 29/06* (2006.01)
*B60H 1/32* (2006.01)
*B60K 6/448* (2007.10)
*F01P 7/16* (2006.01)
*B60K 6/485* (2007.10)
*F01P 5/12* (2006.01)
*F01P 7/14* (2006.01)

(52) U.S. Cl.
CPC ......... *B60H 1/32281* (2019.05); *B60K 6/448* (2013.01); *B60K 6/485* (2013.01); *F01P 3/20* (2013.01); *F01P 7/164* (2013.01); *F01P 11/16* (2013.01); *B60H 2001/3266* (2013.01); *F01P 2005/125* (2013.01); *F01P 2007/146* (2013.01); *F01P 2025/32* (2013.01); *F01P 2050/24* (2013.01); *F01P 2060/08* (2013.01); *F01P 2060/14* (2013.01); *F02D 29/06* (2013.01); *Y02T 10/6226* (2013.01)

(58) Field of Classification Search
CPC .... F01P 7/164; F01P 3/20; F01P 11/16; F01P 2060/14; F01P 2060/08; F01P 2050/24; F01P 2005/125; F01P 2025/32; F01P 2007/146; F02D 29/06; Y02T 10/6226
See application file for complete search history.

(56) References Cited

U.S. PATENT DOCUMENTS

| | | | |
|---|---|---|---|
| 2015/0273976 A1* | 10/2015 | Enomoto | B60K 6/22 165/202 |
| 2015/0295285 A1* | 10/2015 | Takeuchi | F25B 5/00 62/498 |
| 2016/0159204 A1* | 6/2016 | Katoh | B60H 1/3211 62/185 |
| 2016/0332505 A1* | 11/2016 | Yamanaka | B60H 1/143 |
| 2016/0339767 A1* | 11/2016 | Enomoto | F25B 25/005 |
| 2017/0008373 A1* | 1/2017 | Makihara | B60K 11/02 |

OTHER PUBLICATIONS

Apr. 4, 2017 International Search Report issued in International Patent Application No. PCT/JP2017/003618.

* cited by examiner

AIR-CONDITIONER FOR VEHICLE

CROSS-REFERENCE TO RELATED APPLICATION

This application claims the benefit of the priority to Japanese Patent Application No. 2016-18401 filed Feb. 2, 2016, the entire contents of which are incorporated herein by reference.

TECHNICAL FIELD

The present disclosure relates to an air-conditioner for a vehicle.

BACKGROUND ART

In recent years, a hybrid vehicle equipped with an engine and a motor as a vehicle power source has attracted attention for the reasons of societal demands such as low fuel consumption and low exhaust emission. Such a hybrid vehicle includes, for example, a vehicle configured such that EV travelling for causing the vehicle to travel by power of a motor with an engine being stopped is performed to improve fuel economy. However, when the time for operating the engine to ensure an amount of heat for heating during, e.g., the wintertime, is increased, the fuel economy has a tendency to be lowered. The amount of heat for heating is an amount of heat of coolant water for the engine.

Thus, Patent Literature 1 describes the technique of mounting a heating device configured to heat coolant water in addition to an engine. In this technique, a heat pump and an exhaust heat recovery unit are provided at the heating device configured to heat the coolant water, and a rotation speed of a compressor of the heat pump is controlled based on a coolant water temperature, an exhaust gas temperature, and engine output to reduce power consumption of the heat pump.

CITATION LIST

Patent Literature

[PTL 1] JP 2007-283830 A

SUMMARY OF THE INVENTION

A higher coolant water temperature results in a lower heat generation efficiency of the heat pump. For this reason, when the output of the heat pump is decreased with an increase in the coolant water temperature, power consumption of the heat pump is reduced so that fuel economy can be improved. An example of the heat generation efficiency of the heat pump is the percentage of a heating amount of the coolant water with respect to consumed energy.

However, when the output of the heat pump is merely decreased with an increase in the coolant water temperature, there is a probability that a target thermal amount for heating cannot be ensured due to an insufficient heating amount of the coolant water. Moreover, in the technique described in Patent Literature 1, the output of the heat pump is set according to the coolant water temperature and the engine output, and the rotation speed of the compressor of the heat pump is decreased with an increase in the coolant water temperature and the engine output such that the output of the heat pump is decreased. Thus, depending on the engine output, the output of the heat pump cannot be decreased much even when the coolant water temperature is high. This leads to a probability that the fuel economy cannot be effectively improved.

The present disclosure is intended to provide an air-conditioner for a vehicle configured so that in a system including a heat pump configured to heat engine coolant water, a target heating thermal amount can be ensured while fuel economy is improved.

The present disclosure is an air-conditioner for a vehicle including a coolant water circuit (23) configured such that coolant water of an engine (11), which is a vehicle drive source, circulates between the engine (11) and a heat pump (26) configured to heat the coolant water, a water temperature sensor (31) configured to detect the temperature of the coolant water flowing in the coolant water circuit, and an output controller (39) configured to execute the heating thermal amount control of setting, according to a coolant water temperature as the temperature of the coolant water detected by the water temperature sensor, the output of the heat pump and the output of the engine to ensure a predetermined target heating thermal amount.

According to the present disclosure, the air-conditioner is executed the heating thermal amount control of setting the output of the heat pump and the output of the engine according to the coolant water temperature, to ensure the target heating thermal amount. In this heating thermal amount control, the output of the heat pump and the output of the engine can be changed in response to a change in a heat generation efficiency of the heat pump according to the coolant water temperature. Thus, in a water temperature range where the heat generation efficiency of the heat pump is low, the output of the heat pump is decreased such that fuel economy is improved. Meanwhile, the output of the engine is increased, and accordingly, a heating amount of the coolant water for the engine is increased. In this manner, the target heating thermal amount can be ensured.

Note that each reference numeral in parentheses as described in "Summary of the Invention" and "CLAIMS" indicates a correspondence with "Description of Embodiments" described later, and is not intended to limit the "Summary of the Invention" and "CLAIMS" to the "Description of Embodiments."

DESCRIPTION OF EMBODIMENTS

Figure 1:
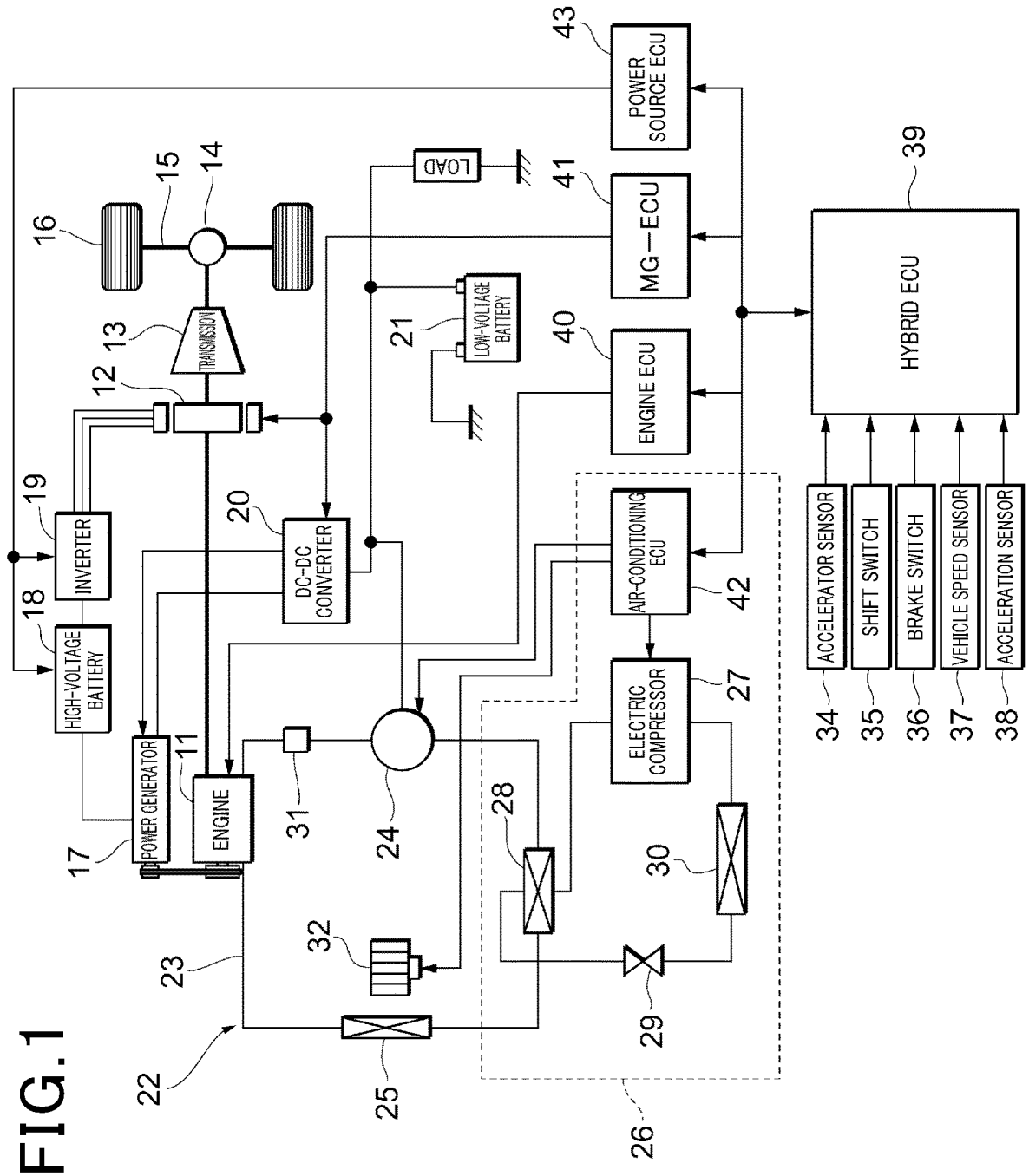
FIG. 1 is a diagram of an outline configuration of a control system of a hybrid vehicle in a first embodiment.

Hereinafter, the present embodiments will be described with reference to the attached drawings. For the sake of easy understanding of description, the same reference numerals are used to the extent possible for the same components in each drawing, and overlapping description will not be repeated.

First Embodiment

A first embodiment will be described with reference to FIGS. 1 to 4. First, an outline configuration of a control system of a hybrid vehicle will be described with reference to FIG. 1.

An engine 11 as an internal-combustion engine and a motor generator (hereinafter referred to as "MG") 12 are mounted as a vehicle power source. Power of a crankshaft as an output shaft of the engine 11 is transmitted to a transmission 13 via the MG 12. Power of an output shaft of the transmission 13 is transmitted to wheels 16 as drive wheels via a differential gear mechanism 14 and an axle 15. The transmission 13 may be an automatic/manual transmission configured to switch a gear position in a stepwise manner among multiple gear positions, or a continuously variable transmission as CVT configured to shift gears steplessly.

A rotary shaft of the MG 12 is coupled so that the power can be transmitted between the engine 11 and the transmission 13 in a power transmission path for transmitting the power of the engine 11 to the wheels 16. Note that a clutch for intermittently transmitting the power may be provided between the engine 11 and the MG 12 or between the MG 12 and the transmission 13.

A high-voltage battery 18 is charged with power generated by a power generator 17 driven by the power of the engine 11. Moreover, an inverter 19 configured to drive the MG 12 is connected to the high-voltage battery 18, and the MG 12 exchanges power with the high-voltage battery 18 via the inverter 19. A low-voltage battery 21 is connected to the power generator 17 via a DC-DC converter 20.

Any of the high-voltage battery 18 and the low-voltage battery 21 is a chargeable/dischargeable battery, and the DC-DC converter 20 is connected to between the high-voltage battery 18 and the low-voltage battery 21. Further, a low-voltage load consuming the power supplied from the high-voltage battery 18 via the DC-DC converter 20 or the power supplied from the low-voltage battery 21 is connected to the DC-DC converter 20.

In addition, a hot-water heating device 22 configured to utilize heat of coolant water of the engine 11 is mounted as a heating device which is an air-conditioner for heating the inside of a vehicle compartment. In the hot-water heating device 22, a heating coolant water circuit 23 is connected to a coolant water path as a water jacket of the engine 11. An electric water pump 24 and a heater core 25 for heating are provided at the heating coolant water circuit 23. Further, a heat pump 26 is, in addition to the engine 11, provided as a heat source for heating the coolant water at the heating coolant water circuit 23. The heat pump 26 is arranged downstream of the engine 11, and the heater core 25 is arranged downstream of the heat pump 26.

The electric water pump 24 is driven by the power of the low-voltage battery 21. By the electric water pump 24, the coolant water circulates and flows in the heating coolant water circuit 23. At this point, in the first embodiment, the coolant water circulates and flows in the order of the engine 11, the heat pump 26, the heater core 25, and the engine 11.

The heat pump 26 compresses low-temperature low-pressure gas refrigerant into high-temperature high-pressure gas refrigerant at an electric compressor 27, and then, generates high-pressure liquid refrigerant by heat release from the high-temperature high-pressure gas refrigerant at a heater 28. Thereafter, the high-pressure liquid refrigerant is depressurized and expanded into low-temperature low-pressure liquid refrigerant at an expansion valve 29, and then, low-temperature low-pressure gas refrigerant is generated by heat absorption by the low-temperature low-pressure liquid refrigerant at an external heat exchanger 30.

The heater 28 of the heat pump 26 exchanges heat between the refrigerant and the coolant water, thereby heating the coolant water by heat of the refrigerant. Meanwhile, the heater core 25 exchanges heat between the coolant water and air, thereby heating the air by means of the heat of the coolant water. A blower fan 32 configured to generate hot air is arranged near the heater core 25.

At the heating coolant water circuit 23, an engine outlet water temperature sensor 31 configured to detect an engine outlet water temperature as the temperature of the coolant water flowing out of the engine 11 is arranged as a water temperature sensor configured to detect the temperature of the coolant water flowing in the heating coolant water circuit 23.

Moreover, the degree of opening of an accelerator as the amount of operation of an accelerator pedal is detected by an accelerator sensor 34. A shift lever operation position is detected by a shift switch 35. Brake operation is detected by a brake switch 36. The amount of operation of a brake may be detected by a brake sensor. A vehicle speed is detected by a vehicle speed sensor 37. An acceleration is detected by an acceleration sensor 38.

A hybrid ECU 39 is a control device configured to control the entirety of the vehicle in an integrated manner, and reads output signals of various sensors and switches described above to detect a vehicle operation state. The hybrid ECU 39 transmits/receives a control signal, a data signal, etc. to/from an engine ECU 40, a MG-ECU 41, and an air-conditioning ECU 42.

The engine ECU 40 is a control device configured to control operation of the engine 11. The MG-ECU 41 is a control device configured to control the inverter 19 to control the MG 12 and to control the power generator 17 and the DC-DC converter 20. The air-conditioning ECU 42 is a control device configured to control the hot-water heating device 22. The air-conditioning ECU 42 controls, for example, the electric water pump 24, the electric compressor 27, and the blower fan 32.

The hybrid ECU 39 controls, for example, the engine 11, the MG 12, the power generator 17, the DC-DC converter 20, and the hot-water heating device 22 according to the vehicle operation state by the ECUs 40, 41, and 42. Further, the hybrid ECU 39 also transmits/receives a control signal, a data signal, etc. to/from a power source ECU 43 configured to monitor the high-voltage battery 18.

At this point, the hybrid ECU 39 switches a travelling mode among an engine travelling mode, an assist travelling mode, and an EV travelling mode, for example. In the engine travelling mode, engine travelling is performed such that the wheels 16 are driven only by the power of the engine 11 to cause the vehicle to travel. In the assist travelling mode, assist travelling is performed such that the wheels 16 are driven by both of the power of the engine 11 and the power of the MG 12 to cause the vehicle to travel. In the EV travelling mode, EV travelling is performed such that the wheels 16 are driven only by the power of the MG 12 to cause the vehicle to travel. Such EV travelling is allowed when the engine outlet water temperature becomes equal to or higher than a warm-up completion water temperature which is an engine-stoppable temperature, for example.

Moreover, at the time of braking the vehicle, the hybrid ECU 39 switches the travelling mode to a regenerative power generation mode. Braking occurs when the vehicle is generating braking force when the accelerator is turned off or when the brake is turned on, for example. In this regenerative power generation mode, the MG 12 is driven by power from the wheels 16 to perform regenerative power generation for converting vehicle kinetic energy into electric energy using the MG 12, and the high-voltage battery 18 is charged with regenerative power as such generated power. With this configuration, an assist or EV travelling available time is increased so that fuel economy can be improved.

Figure 2:
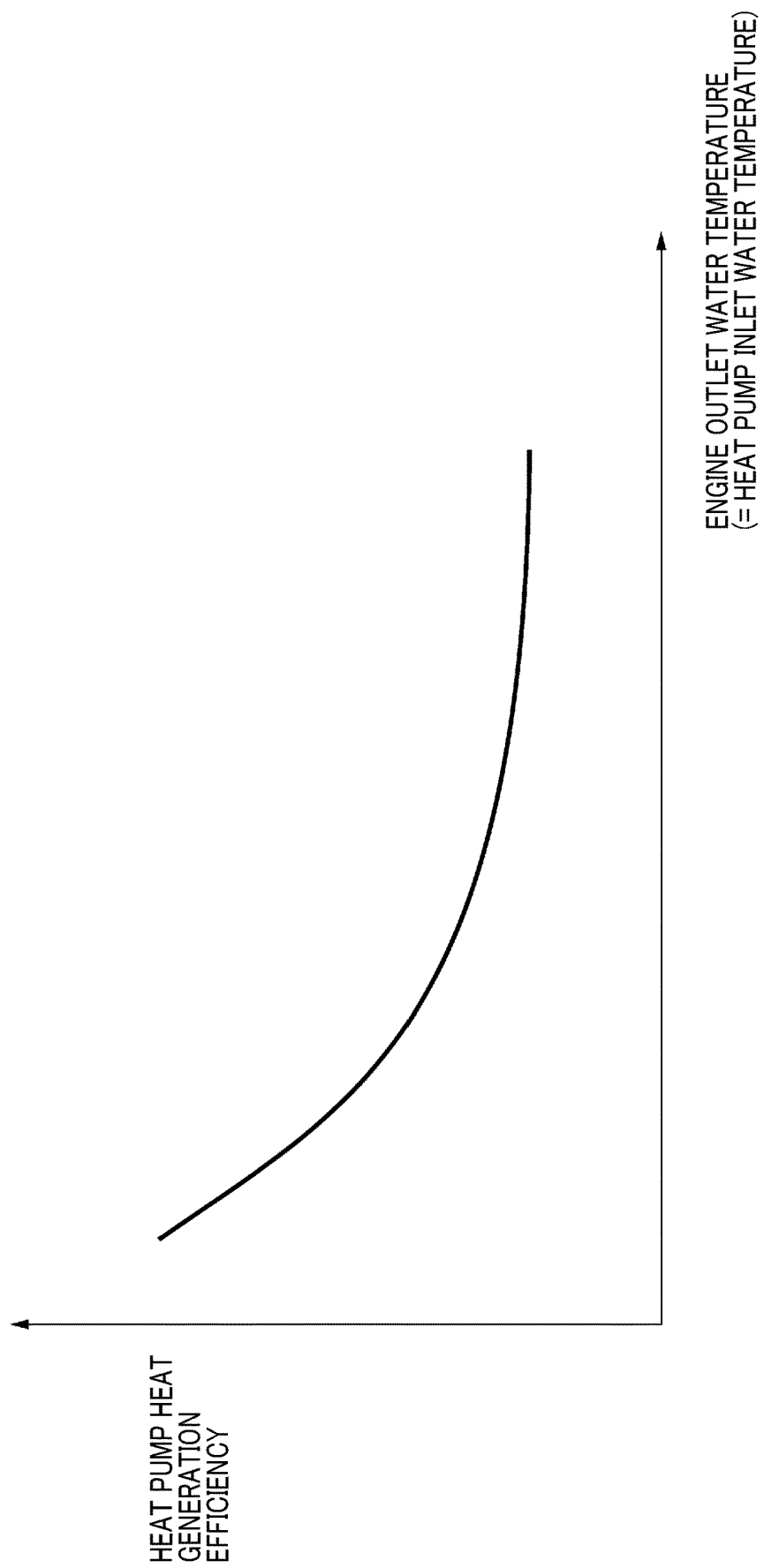
FIG. 2 is a graph of a relationship between an engine outlet water temperature and a heat generation efficiency of a heat pump.

As illustrated in FIG. 2, a higher engine outlet water temperature results in a higher heat pump inlet water temperature, and therefore, results in a lower heat generation efficiency of the heat pump 26. The heat pump inlet water temperature is the temperature of the coolant water flowing into the heat pump 26. The heat generation efficiency of the heat pump 26 is the percentage of a coolant water heating amount with respect to consumed energy of the heat pump 26, for example.

Thus, when the output of the heat pump 26 is decreased with an increase in the engine outlet water temperature, power consumption of the heat pump 26 is reduced so that the fuel economy can be improved. However, when the output of the heat pump 26 is merely decreased with an increase in the engine outlet water temperature, there is a probability that a target heating thermal amount cannot be ensured due to an insufficient coolant water heating amount.

For this reason, the hybrid ECU 39 sets the output of the heat pump 26 and the output of the engine 11 according to the engine outlet water temperature to execute heating thermal amount control for ensuring the target heating thermal amount. In other words, the hybrid ECU 39 sets the output of the heat pump 26 and the output of the engine 11 according to the engine outlet water temperature to execute heating thermal amount control for producing a predetermined heat output. In the heating thermal amount control, the output of the heat pump 26 and the output of the engine 11 can be changed according to the engine outlet water temperature in response to a change in the heat generation efficiency of the heat pump 26. With this configuration, the fuel economy can be improved in such a manner that the output of the heat pump 26 is decreased in a water temperature range where the heat generation efficiency of the heat pump 26 is low. Meanwhile, the target heating thermal amount can be ensured in such a manner that the output of the engine 11 is increased and a coolant water heating amount of the engine 11 is increased accordingly. Further, the hybrid ECU 39 increases a power generation amount of the power generator 17 by an amount corresponding to an output increment of the engine 11 by the heating thermal amount control. Note that in a case where it is determined that fluctuation in vehicle drive force is allowed, not only the power generation amount but also the vehicle drive force may be increased in such a manner that the output of the engine 11 is increased by the heating thermal amount control.

Figure 4:
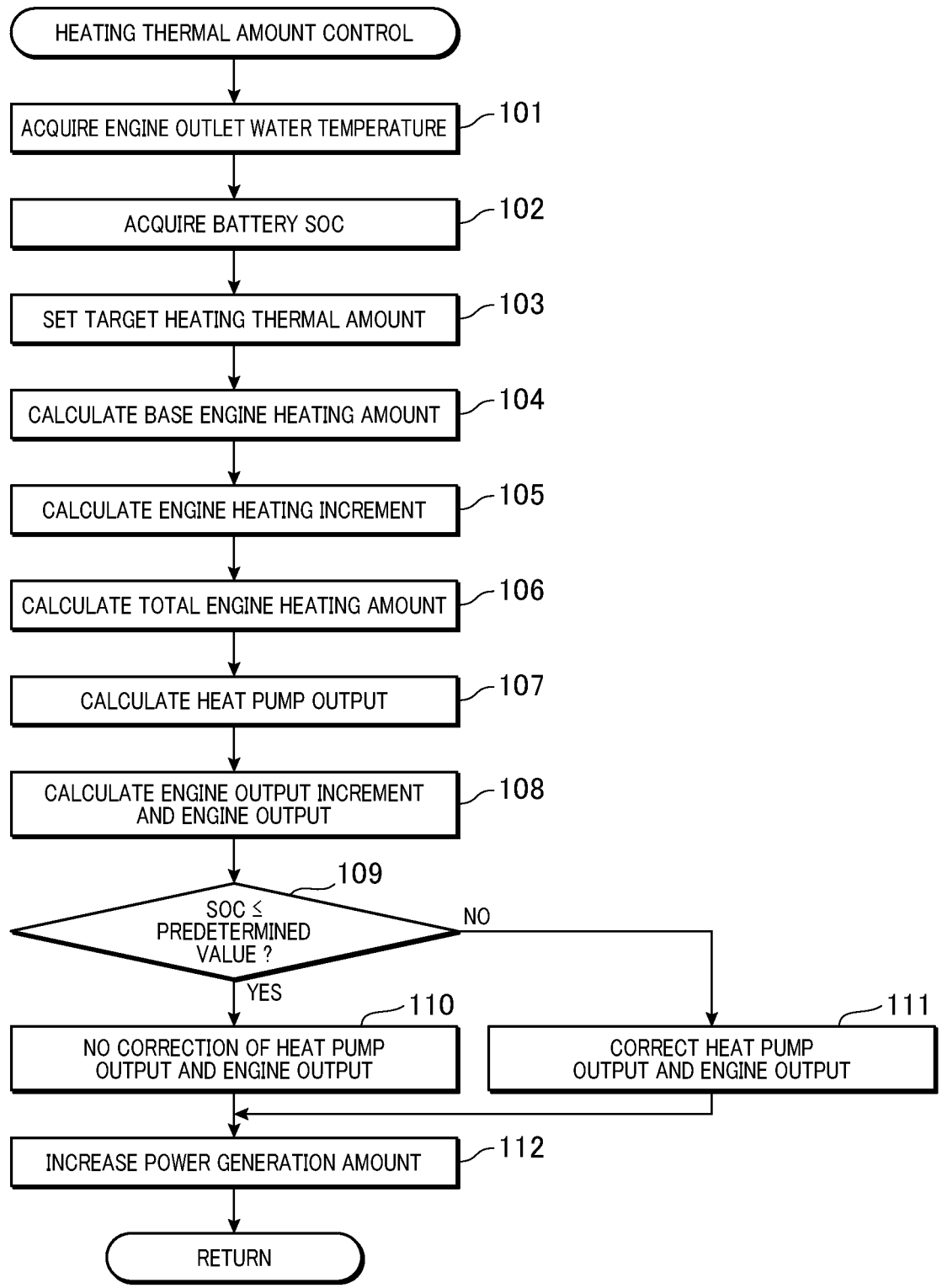
FIG. 4 is a flowchart of the flow of processing of a heating thermal amount control routine of the first embodiment.

In the first embodiment, a heating thermal amount control routine of FIG. 4 as described later is executed by the hybrid ECU 39 for performing the following heating thermal amount control. In the heating thermal amount control of the first embodiment, the control of decreasing the output of the heat pump 26 and increasing the output of the engine 11 with an increase in the engine outlet water temperature to produce the target heating thermal amount is performed.

Hereinafter, details of processing performed by the heating thermal amount control routine of FIG. 4 executed by the hybrid ECU 39 in the first embodiment will be described. The heating thermal amount control routine illustrated in FIG. 4 is repeatedly executed in predetermined cycles during a power-ON period of the hybrid ECU 39, and fulfills a role as an output controller of the present disclosure.

When the present routine is started, the engine outlet water temperature detected by the engine outlet water temperature sensor 31 is first acquired at step 101. Thereafter, the processing proceeds to step 102, and a SOC indicating the remaining capacity of the high-voltage battery 18 is acquired. The SOC is, for example, defined by the following expression:

$$SOC = \text{Remaining Capacity/Full Charge Capacity} \times 100$$

Thereafter, the processing proceeds to step 103, and the target heating thermal amount as a required heating load is set based on a target heating water temperature etc. The target heating thermal amount described herein is, for example, a target value of a coolant water heat release amount as an air heating amount of the heater core 25 per unit time. Moreover, the target heating water temperature is, for example, a target value of a heater core inlet water temperature, and is set based on an external air temperature, a vehicle compartment inner temperature, a target vehicle compartment inner temperature, etc. The heater core inlet water temperature is the temperature of the coolant water flowing into the heater core 25.

Thereafter, the processing proceeds to step 104, and a base engine heating amount is calculated by, e.g., a map or a mathematical expression according to a required travelling load and a required power generation load. The base engine heating amount described herein is the coolant water heating amount of the engine 11 per unit time at base output of the engine 11 set according to the required travelling load and the required power generation load. Moreover, the required travelling load is required travelling output set based on the degree of opening of the accelerator, for example. The required power generation load is a required power generation amount set based on the SOC of the high-voltage battery 18, for example.

Figure 3:
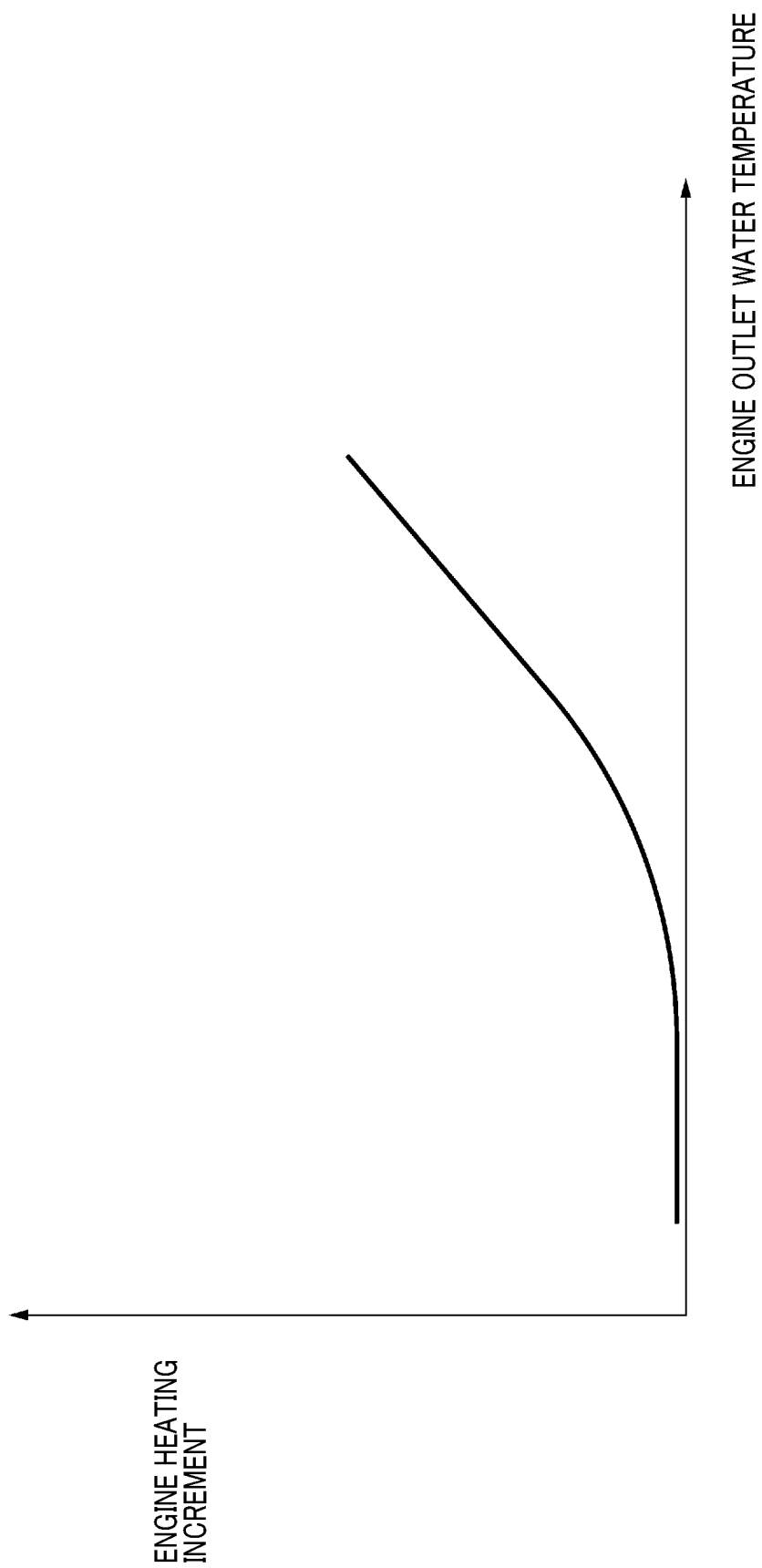
FIG. 3 is a conceptual graph of an example of a map of an engine heating increment.

Thereafter, the processing proceeds to step 105, and an engine heating increment is calculated by, e.g., a map or a mathematical expression according to the engine outlet water temperature. The engine heating increment is the increment of the coolant water heating amount of the engine 11 per unit time. As illustrated in FIG. 3, the map, the mathematical expression, etc. for the engine heating increment is set such that a higher engine outlet water temperature results in a greater engine heating increment.

Thereafter, the processing proceeds to step 106, and the engine heating increment is added to the base engine heating amount to obtain a total engine heating amount.

Total Engine Heating Amount=Base Engine Heating Amount+Engine Heating Increment

Thereafter, the processing proceeds to step 107, and the total engine heating amount is subtracted from the target heating thermal amount to obtain the output of the heat pump 26 (i.e., the coolant water heating amount of the heat pump 26 per unit time).

Heat Pump Output=Target Heating Thermal Amount−Total Engine Heating Amount

Thereafter, the processing proceeds to step 108, and the output increment of the engine 11 is calculated by, e.g., a map or a mathematical expression according to the engine heating increment. The output increment of the engine 11 is added to the base output of the engine 11 to obtain the output of the engine 11.

Thereafter, the processing proceeds to step 109, and it is determined whether or not the SOC of the high-voltage battery 18 is equal to or less than a predetermined value. The predetermined value described herein is, for example, set to a slightly-smaller value than the upper limit of the SOC of the high-voltage battery 18.

At step 109, in a case where it is determined that the SOC of the high-voltage battery 18 is equal to or less than the predetermined value, the processing proceeds to step 110, and the output of the heat pump 26 set at the above-described step 107 and the output of the engine 11 set at the above-described step 108 are directly employed without correction.

Thereafter, the processing proceeds to step 112, and the power generation amount of the power generator 17 is increased by the amount corresponding to the output increment of the engine 11 set at the above-described step 108, and in this manner, addition to the required power generation amount is performed.

On the other hand, in a case where it is, at the above-described step 109, determined that the SOC of the high-voltage battery 18 is greater than the predetermined value, the processing proceeds to step 111. At step 111, the output increment of the engine 11 set at the above-described step 108 is decrease-corrected, and the output of the engine 11 is decrease-corrected. Then, the output of the heat pump 26 set at the above-described step 107 is increase-corrected. In this case, an output correction amount according to the SOC of the high-voltage battery 18 is calculated by a map or a mathematical expression, for example.

The map, the mathematical expression, etc. for the output correction amount is, for example, set such that a greater SOC of the high-voltage battery 18 results in a greater output correction amount. With this output correction amount, the output increment of the engine 11 set at the above-described step 108 is decrease-corrected, and the output of the engine 11 is decrease-corrected. Further, the output of the heat pump 26 set at the above-described step 107 is increase-corrected by an amount corresponding to decrease correction for the output of the engine 11. The amount corresponding to decrease correction is an amount corresponding to the decrement of the coolant water heating amount by decrease correction, for example.

Thereafter, the processing proceeds to step 112, and the power generation amount of the power generator 17 is increased by the amount corresponding to the output increment of the engine 11 subjected to decrease correction at the above-described step 111, and in this manner, addition to the required power generation amount is performed.

In the first embodiment described above, the output of the heat pump 26 is decreased and the output of the engine 11 is increased with an increase in the engine outlet water temperature upon executing the heating thermal amount control. In this manner, the target heating thermal amount is obtained. Thus, in response to a decrease in the heat generation efficiency of the heat pump 26 with an increase in the engine outlet water temperature, the output of the heat pump 26 is decreased so that the fuel economy can be improved while the output of the engine 11 is increased so that the target heating thermal amount can be ensured. In this manner, the heat pump 26 and the engine 11 cooperate with each other so that the fuel economy can be improved while the target heating thermal amount is ensured.

Further, in the first embodiment, the power generation amount of the power generator 17 is increased by the amount corresponding to the output increment of the engine 11 by the heating thermal amount control. This prevents the vehicle drive force from increasing due to an increase in the output of the engine 11 by the heating thermal amount control, and therefore, can prevent lowering of drivability due to the heating thermal amount control. Note that in a case where it is determined that lowering of drivability due to an increase in the vehicle drive force causes no problem, the drive force may be increased.

When the SOC of the high-voltage battery 18 reaches an upper limit, it is not possible to charge the high-voltage battery 18 with the power generated by the power generator 17. For this reason, in the first embodiment, the output of the heat pump 26 and the output of the engine 11 are corrected according to the SOC of the high-voltage battery 18 during execution of the heating thermal amount control. Specifically, when the SOC of the high-voltage battery 18 is greater than the predetermined value, the output of the engine 11 is decrease-corrected, and the output of the heat pump 26 is increase-corrected. With this configuration, when the SOC of the high-voltage battery 18 approaches the upper limit, the output of the engine 11 is decrease-corrected such that the power generation amount of the power generator 17 decreases. This can suppress the SOC of the high-voltage battery 18 from reaching the upper limit. Further, the output of the heat pump 26 is increase-corrected by the amount corresponding to decrease correction for the output of the engine 11, and in this manner, the target heating thermal amount can be ensured. The amount corresponding to decrease correction for the output of the engine 11 is, for example, an amount corresponding to the decrement of the coolant water heating amount by decrease correction.

Second Embodiment

Next, a second embodiment will be described with reference to FIGS. 5 to 8. Note that description of portions substantially identical or similar to those of the first embodiment will be omitted or simplified, and differences from the first embodiment will be mainly described.

For example, a heat pump 26 also changes its heat generation efficiency depending on output as a rotation speed of an electric compressor 27, and an output range with a high heat generation efficiency changes according to an engine outlet water temperature. Considering such characteristics, a heating thermal amount control routine of FIG. 5 as described later is, in the second embodiment, executed by a hybrid ECU 39 for performing the following heating thermal amount control. In the heating thermal amount control of the second embodiment, the control of setting the output of the heat pump 26 to a value within a predetermined range set according to the engine outlet water temperature and setting the output of an engine 11 such that a target heating thermal amount is ensured at the set output of the heat pump 26 is performed.

Hereinafter, details of processing performed by the heating thermal amount control routine of FIG. 5 executed by the hybrid ECU 39 in the second embodiment will be described. This routine of FIG. 5 also fulfills a role as an output controller of the present disclosure.

Figure 5:
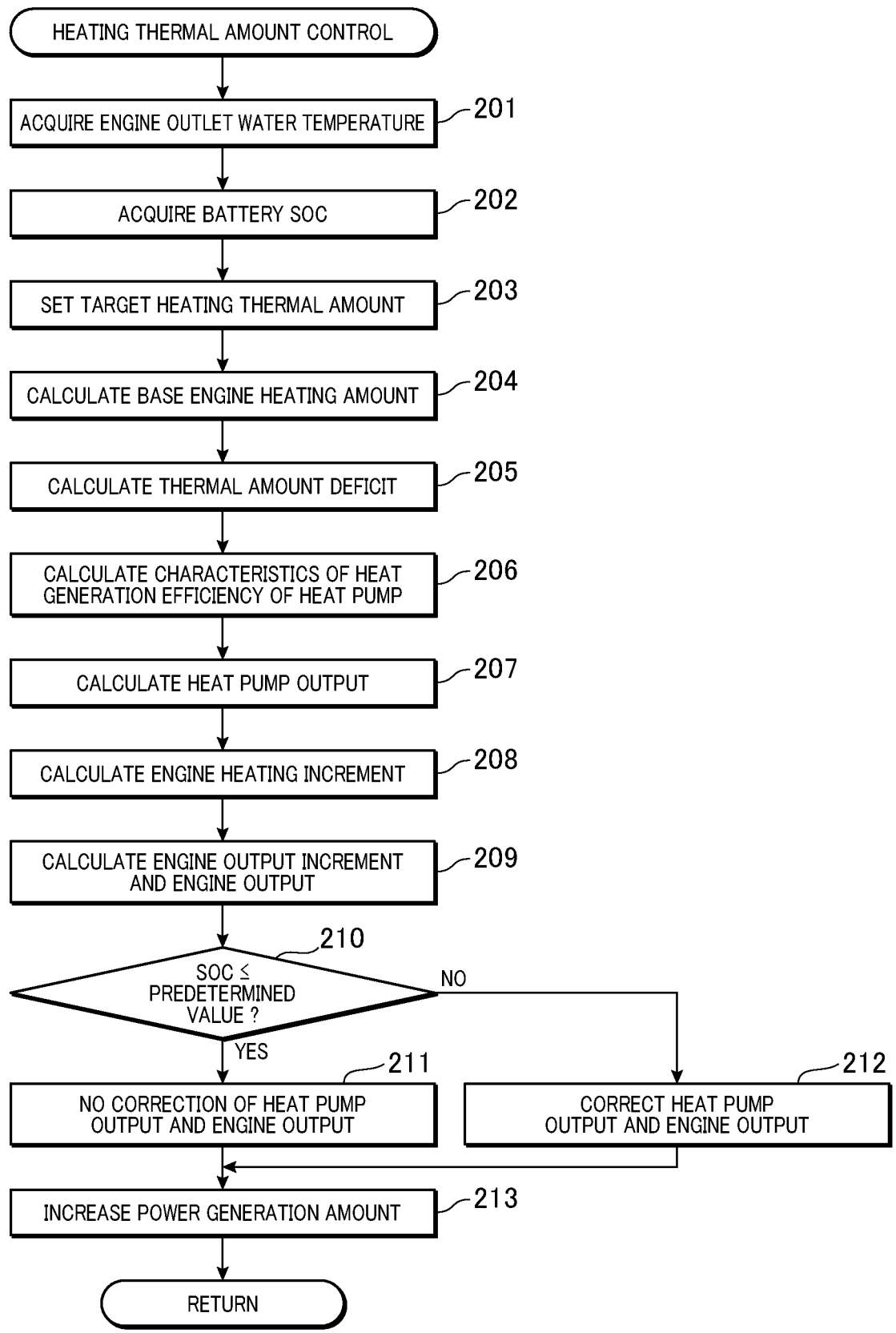
FIG. 5 is a flowchart of the flow of processing of a heating thermal amount control routine of a second embodiment.

In the heating thermal amount control routine of FIG. 5, the engine outlet water temperature detected by an engine outlet water temperature sensor 31 is first acquired at step 201. Thereafter, the processing proceeds to step 202, and the SOC of a high-voltage battery 18 is acquired. Thereafter, the processing proceeds to step 203, and the target heating thermal amount is set based on a target heating water temperature etc. Thereafter, the processing proceeds to step 204, and a base engine heating amount is calculated by, e.g., a map or a mathematical expression according to a required travelling load and a required power generation load.

Figure 6:
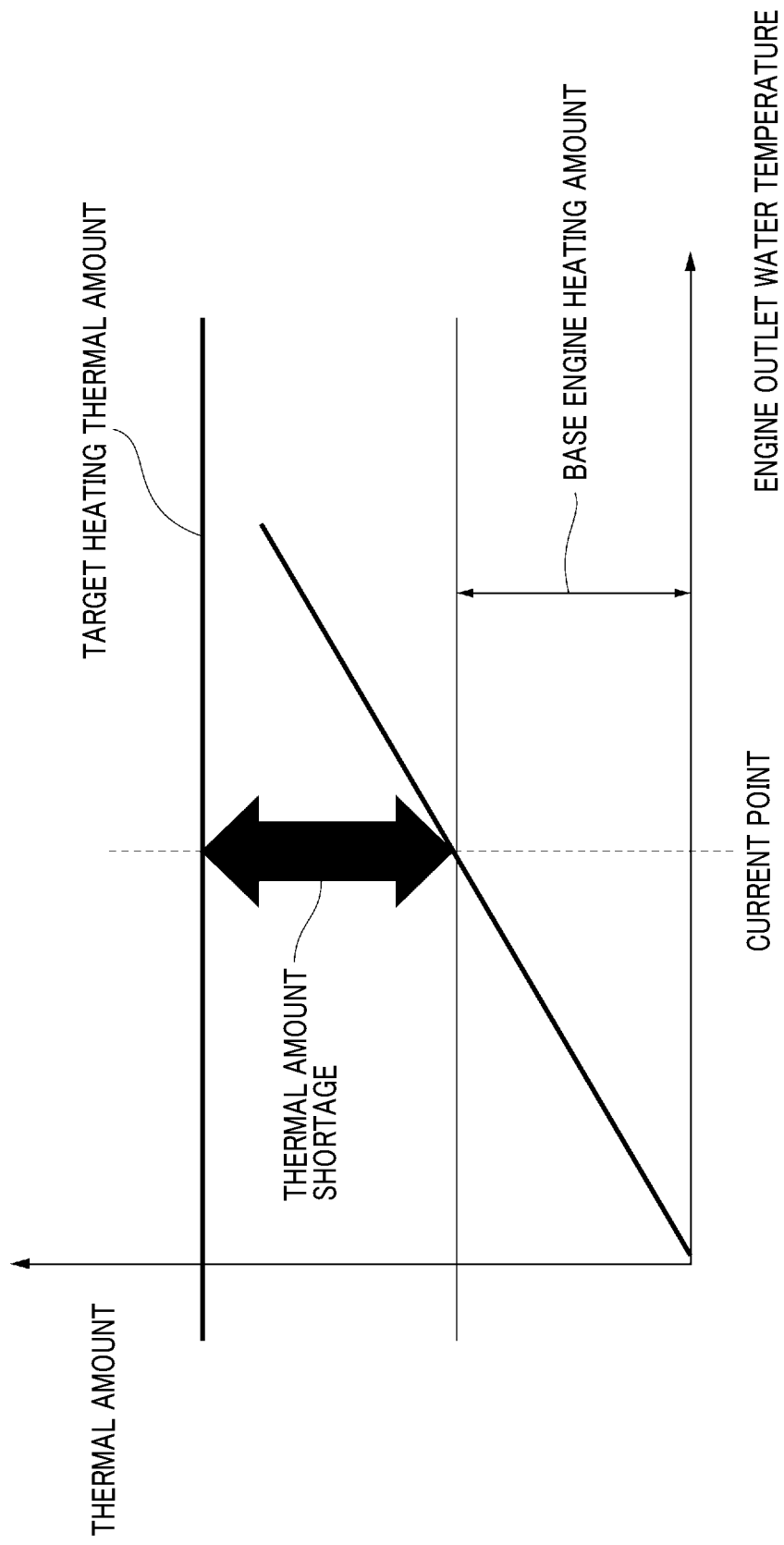
FIG. 6 is a graph for describing the method for calculating a thermal amount shortage.

Thereafter, the processing proceeds to step 205, and the base engine heating amount is subtracted from the target heating thermal amount to obtain a thermal amount shortage as illustrated in FIG. 6.

Figure 7:
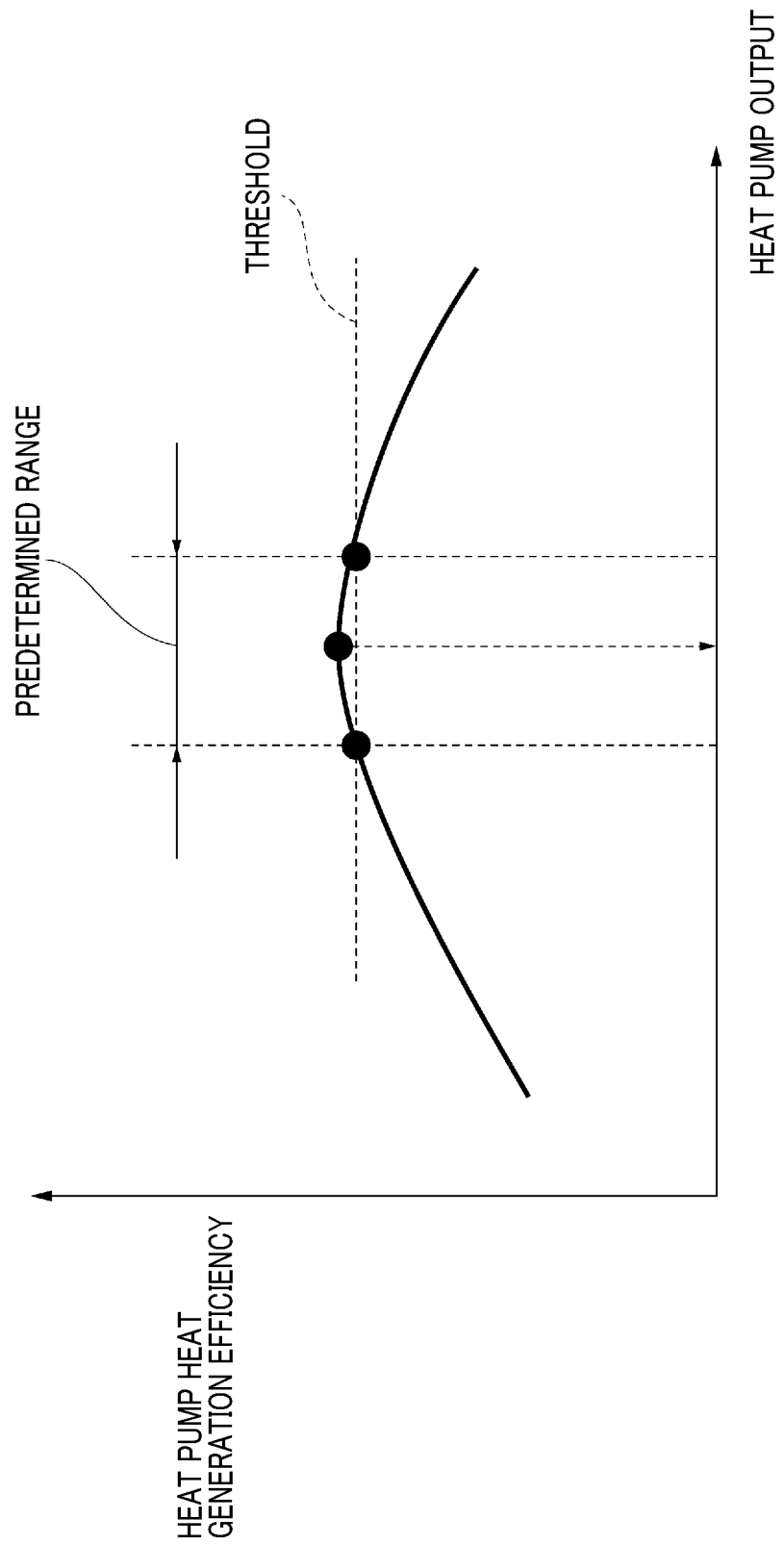
FIG. 7 is a graph for describing the method for calculating heat pump output.

Thermal Amount Shortage=Target Heating Thermal Amount−Base Engine Heating Amount Thereafter, the processing proceeds to step 206, and characteristics of a current heat generation efficiency of the heat pump 26 are calculated based on the engine outlet water temperature, an external air temperature, a vehicle speed, a refrigerant pressure, etc. The heat generation efficiency of the heat pump 26 is the percentage of a coolant water heating amount with respect to consumed energy of the heat pump 26. In this case, a relationship between the output and the heat generation efficiency of the heat pump 26 is obtained as the characteristics of the heat generation efficiency of the heat pump 26 as illustrated in FIG. 7. Note that the characteristics of the heat generation efficiency of the heat pump 26 according to the engine outlet water temperature, the external air temperature, the vehicle speed, the refrigerant pressure, etc. may be stored in advance in ROM of the hybrid ECU 39, for example.

Thereafter, the processing proceeds to step 207, and the output of the heat pump 26 is set to the value within the predetermined range by means of the characteristics of the heat generation efficiency of the heat pump 26 as illustrated in FIG. 7. The predetermined range described herein is the range of the output of the heat pump 26 where the heat generation efficiency of the heat pump 26 is equal to or greater than a threshold, and the threshold is set to the maximum value of the heat generation efficiency×0.9, for example. In the second embodiment, the output of the heat pump 26 is set to an output value at which the heat generation efficiency of the heat pump 26 is highest. The output value at which the heat generation efficiency of the heat pump 26 is highest is an output value at which the heat generation efficiency is the maximum value.

Figure 8:
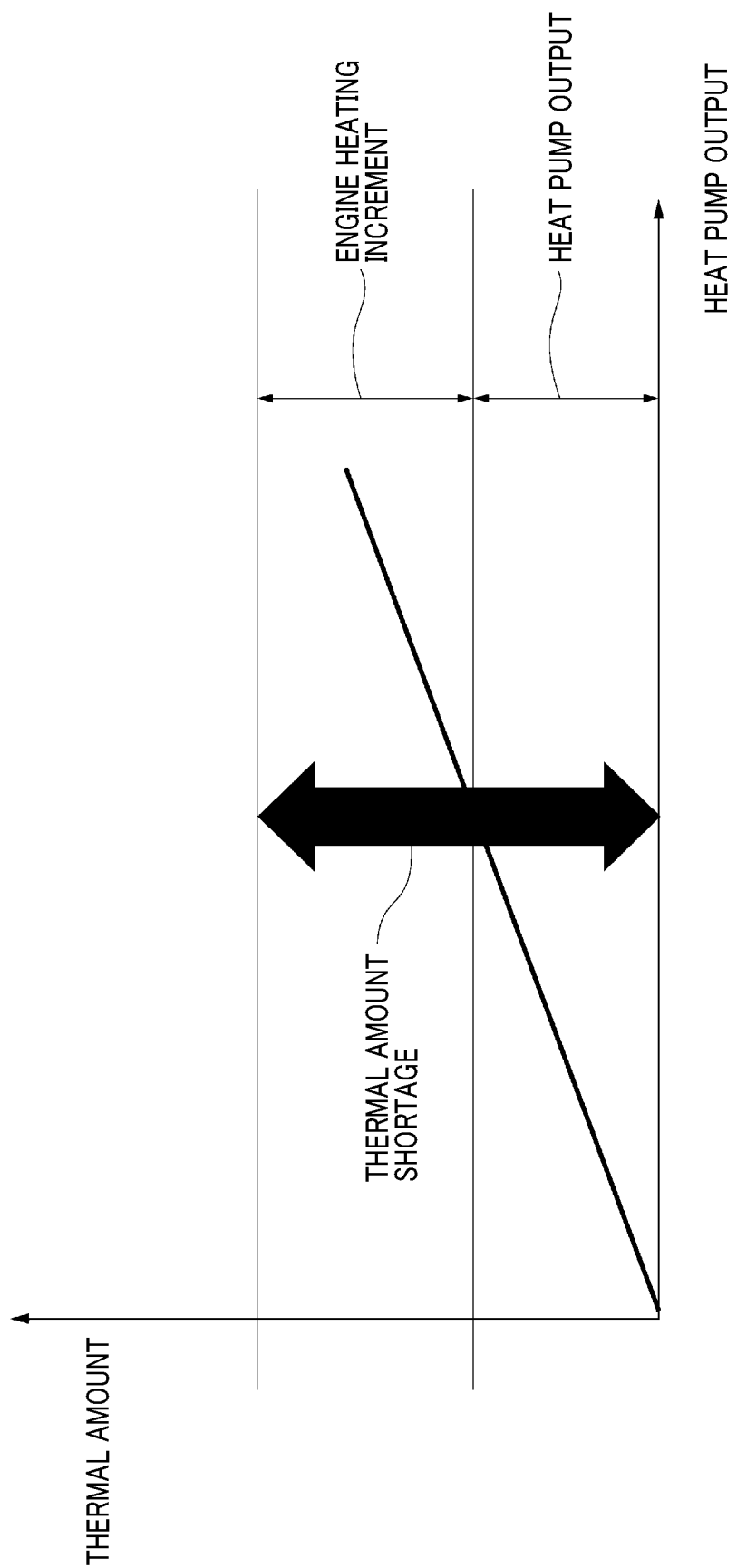
FIG. 8 is a graph for describing the method for calculating an engine heating increment.

After the output of the heat pump 26 has been set as described above, the processing proceeds to step 208. As illustrated in FIG. 8, the output (i.e., the coolant water heating amount) of the heat pump 26 is subtracted from the thermal amount shortage to obtain an engine heating increment.

Engine Heating Increment=Thermal Amount Shortage−Heat Pump Output

Thereafter, the processing proceeds to step 209, and an output increment of the engine 11 is calculated by, e.g., a map or a mathematical expression according to the engine heating increment. The output increment of the engine 11 is added to base output of the engine 11 to obtain the output of the engine 11.

Thereafter, the processing proceeds to step 210, and it is determined whether or not the SOC of the high-voltage battery 18 is equal to or less than a predetermined value. At step 210, in a case where it is determined that the SOC of the high-voltage battery 18 is equal to or less than the predetermined value, the processing proceeds to step 211, and the output of the heat pump 26 set at the above-described step 207 and the output of the engine 11 set at the above-described step 209 are directly employed without correction. Thereafter, the processing proceeds to step 213, and a power generation amount of a power generator 17 is increased by an amount corresponding to the output increment of the engine 11 set at the above-described step 209.

On the other hand, in a case where it is, at the above-described step 210, determined that the SOC of the high-voltage battery 18 is greater than the predetermined value, the processing proceeds to step 212. At step 212, the output increment of the engine 11 set at the above-described step 209 is decrease-corrected, and the output of the engine 11 is decrease-corrected. Moreover, the output of the heat pump 26 set at the above-described step 207 is increase-corrected. Thereafter, the processing proceeds to step 213, and the power generation amount of the power generator 17 is increased by the amount corresponding to the output increment of the engine 11 subjected to decrease correction at the above-described step 212.

In the second embodiment described above, the output of the heat pump 26 is, upon executing the heating thermal amount control, set to the output value in such a range that the heat generation efficiency of the heat generation efficiency characteristics of the heat pump 26 set according to the engine outlet water temperature is equal to or greater than the threshold. Specifically, the output of the heat pump 26 is set to the output value at which the heat generation efficiency of the heat pump 26 is highest. The output of the engine 11 is set such that the target heating thermal amount is ensured at the set output of the heat pump 26. In this manner, the heat pump 26 and the engine 11 can also cooperate with each other to improve fuel economy while the target heating thermal amount is ensured. In addition, the output of the heat pump 26 can be set to the output value at which the heat generation efficiency of the heat pump 26 is highest at the engine outlet water temperature of the moment, and therefore, the fuel economy can be effectively improved.

Note that in the above-described second embodiment, the output of the heat pump 26 is set to the output value at which the heat generation efficiency of the heat pump 26 is highest, but the present disclosure is not limited to such a configuration. As long as the heat generation efficiency of the heat pump 26 is in the range of equal to or greater than the threshold, the output of the heat pump 26 may be set to other values than the output value at which the heat generation efficiency of the heat pump 26 is highest.

Moreover, the output of the heat pump 26 changes according to the rotation speed of the electric compressor 27, and therefore, the rotation speed of the electric compressor 27 may be used as a proxy for the output of the heat pump 26.

That is, the rotation speed of the electric compressor 27 may be set to a rotation speed value within such a range that the heat generation efficiency of the heat generation efficiency characteristics of the heat pump 26 set according to the engine outlet water temperature is equal to or greater than the threshold.

Third Embodiment

Next, a third embodiment will be described with reference to FIGS. 9 to 14. Note that description of portions substantially identical or similar to those of the first and second embodiments will be omitted or simplified, and differences from the first and second embodiments will be mainly described.

In the third embodiment, a heating thermal amount control routine of FIG. 9 as described later is executed by a hybrid ECU 39 for performing the following heating thermal amount control. In the heating thermal amount control of the third embodiment, characteristics of a heat generation efficiency of a heat pump 26 are set based on an engine outlet water temperature etc. The heat generation efficiency of the heat pump 26 is the percentage of a coolant water heating amount with respect to consumed energy of the heat pump 26. Moreover, characteristics of a power generation efficiency of an engine 11 are set. The power generation efficiency of the engine 11 is the percentage of a power generation amount of a power generator 17 with respect to a consumed fuel amount of the engine 11. The control of setting the output of the heat pump 26 and the output of the engine 11 such that the integrated efficiency of the heat generation efficiency of the heat pump 26 and the power generation efficiency of the engine 11 is highest under a condition where a target heating thermal amount can be ensured.

Hereinafter, details of processing performed by the heating thermal amount control routine of FIG. 9 executed by the hybrid ECU 39 in the third embodiment will be described. This routine of FIG. 9 also fulfills a role as an output controller of the present disclosure.

Figure 9:
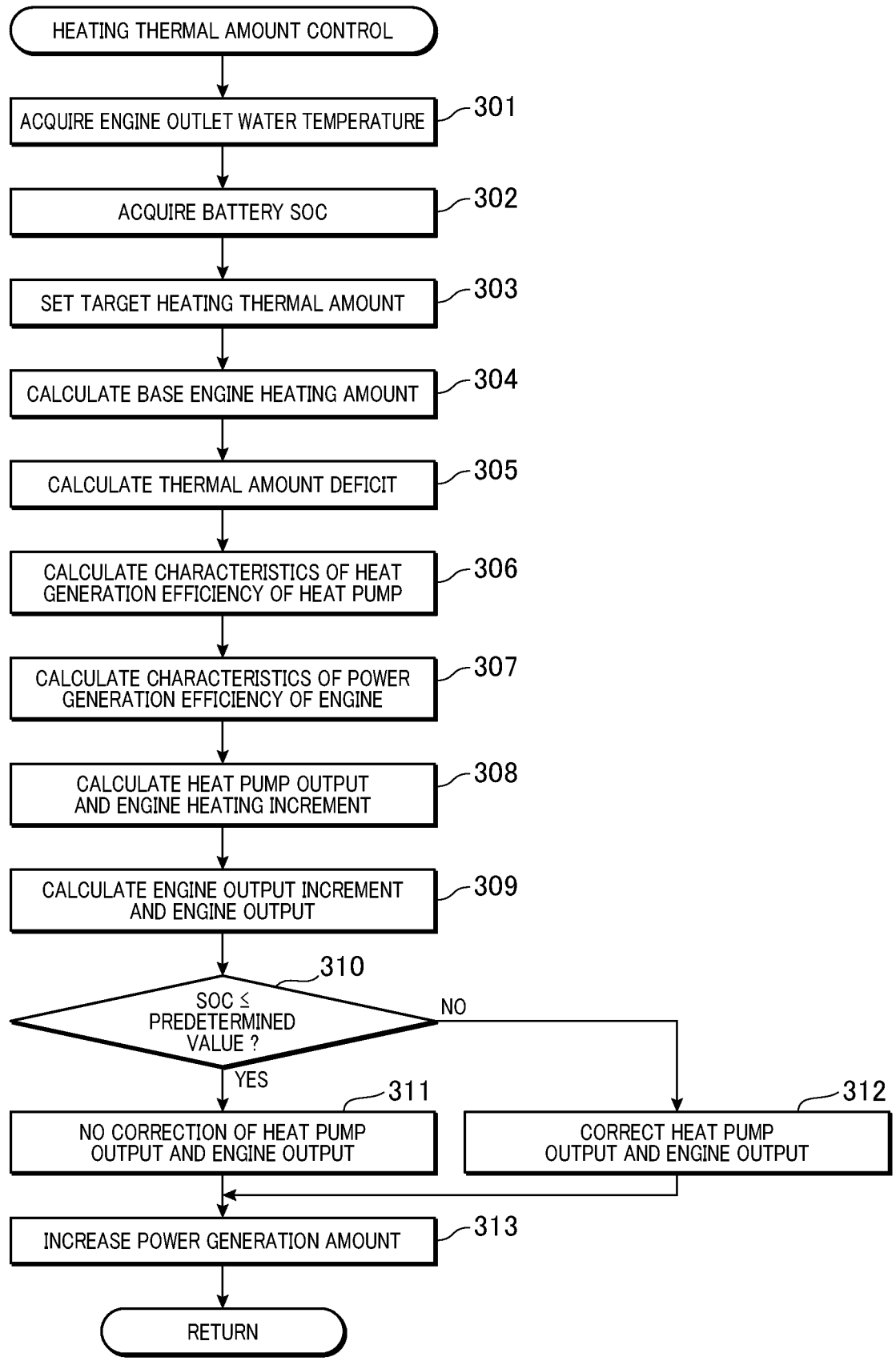
FIG. 9 is a flowchart of the flow of processing of a heating thermal amount control routine of a third embodiment.

In the heating thermal amount control routine of FIG. 9, the engine outlet water temperature detected by an engine outlet water temperature sensor 31 is first acquired at step 301. Thereafter, the processing proceeds to step 302, and the SOC of a high-voltage battery 18 is acquired. Thereafter, the processing proceeds to step 303, and the target heating thermal amount is set based on a target heating water temperature etc. Thereafter, the processing proceeds to step 304, and a base engine heating amount is calculated by, e.g., a map or a mathematical expression according to a required travelling load and a required power generation load.

Thereafter, the processing proceeds to step 305, and the base engine heating amount is subtracted from the target heating thermal amount to obtain a thermal amount shortage.

Figure 10:
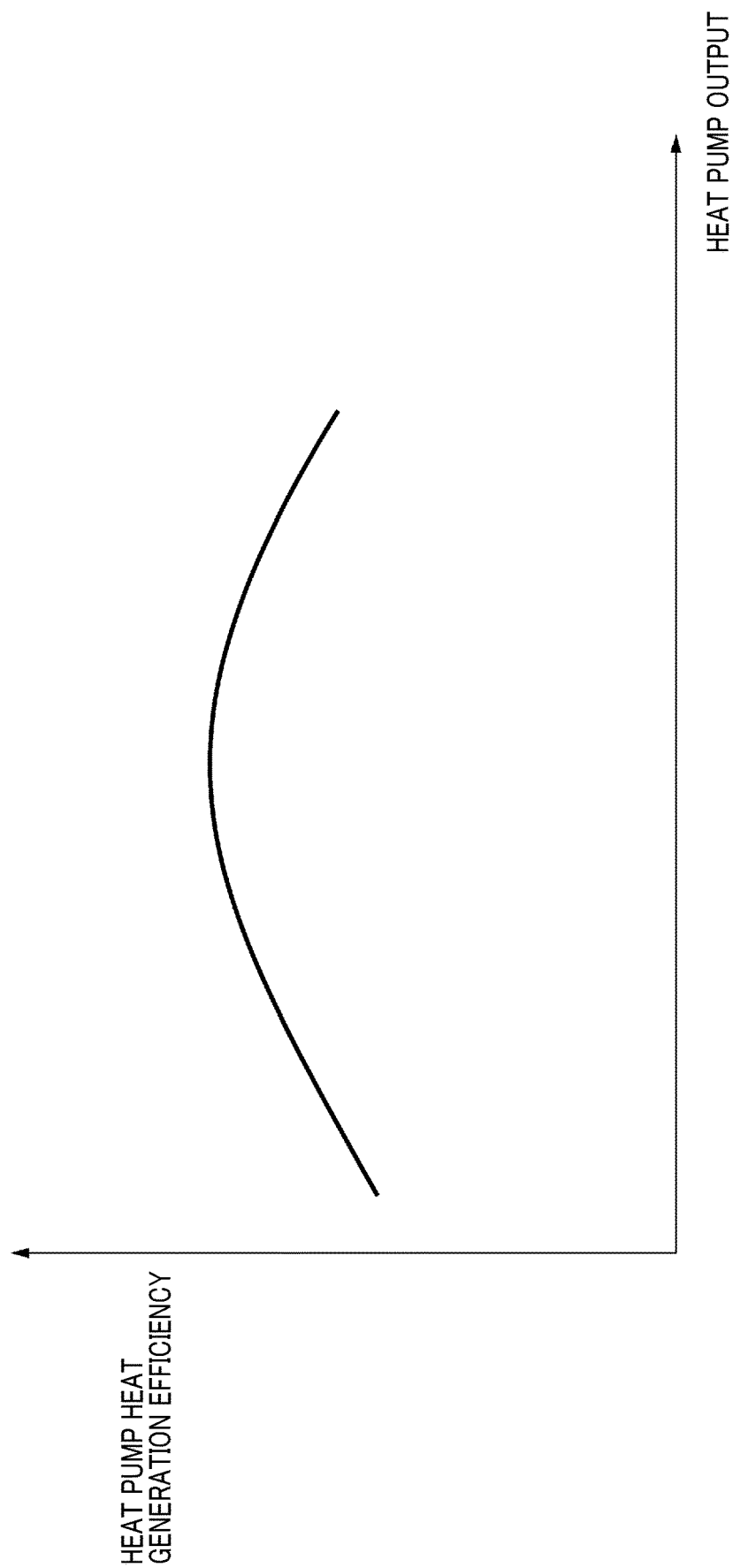
FIG. 10 is a graph of an example of characteristics of a heat generation efficiency of a heat pump.
Figure 11:
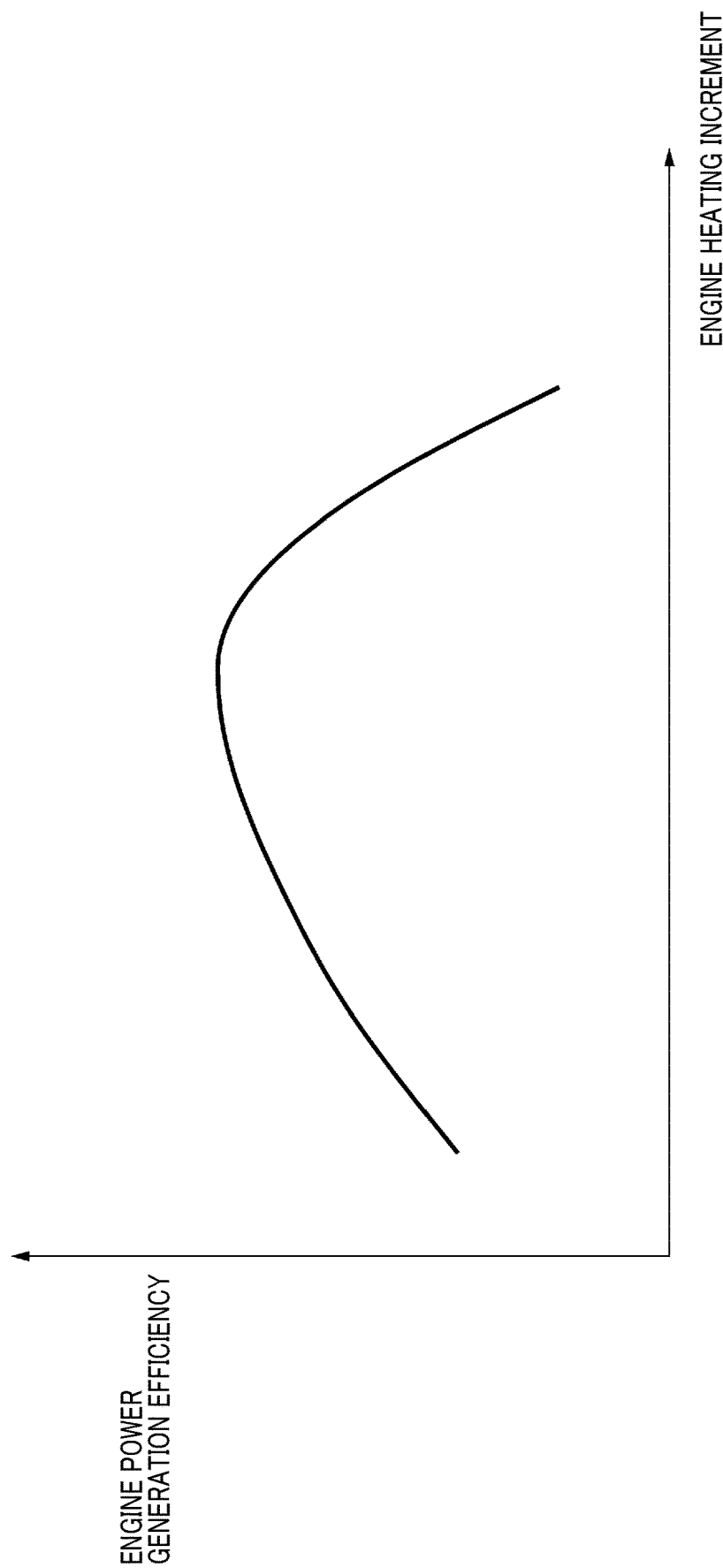
FIG. 11 is a graph of an example of characteristics of a power generation efficiency of an engine.

Thermal Amount Shortage=Target Heating Thermal Amount−Base Engine Heating Amount Thereafter, the processing proceeds to step 306, and characteristics of a current heat generation efficiency of the heat pump 26 are calculated based on the engine outlet water temperature, an external air temperature, a vehicle speed, a refrigerant pressure, etc. In this case, a relationship between the output and the heat generation efficiency of the heat pump 26 is obtained as the characteristics of the heat generation efficiency of the heat pump 26 as illustrated in FIG. 10. Note that the characteristics of the heat generation efficiency of the heat pump 26 according to the engine outlet water temperature, the external air temperature, the vehicle speed, the refrigerant pressure, etc. may be stored in advance in the a ROM of the hybrid ECU 39, for example.

Thereafter, the processing proceeds to step 307, and characteristics of a current power generation efficiency of the engine 11 are calculated based on the engine outlet water temperature, the external air temperature, etc. In this case, a relationship between an engine heating increment due to an increase in the output of the engine 11 and the power generation efficiency is obtained as the characteristics of the power generation efficiency of the engine 11. Note that the characteristics of the power generation efficiency of the engine 11 according to the engine outlet water temperature, the external air temperature, etc. may be stored in advance in the ROM of the hybrid ECU 39, for example.

Thereafter, the processing proceeds to step 308, and the output of the heat pump 26 and the engine heating increment are calculated such that the integrated efficiency of the heat generation efficiency of the heat pump 26 and the power generation efficiency of the engine 11 is highest under the condition where the target heating thermal amount can be ensured.

For example, an efficiency obtained by multiplying the heat generation efficiency Kh of the heat pump 26 by the power generation efficiency Ke of the engine 11 is taken as the integrated efficiency K.

Integrated Efficiency $K$=Heat Pump Heat Generation Efficiency $Kh$×Engine Power Generation Efficiency $Ke$ For ensuring the target heating thermal amount, the output (i.e., a coolant water heating amount) of the heat pump 26 and the engine heating increment need to satisfy the following expression (A):

Thermal Amount Shortage=Heat Pump Output+Engine Heating Increment  (A)

Figure 12:
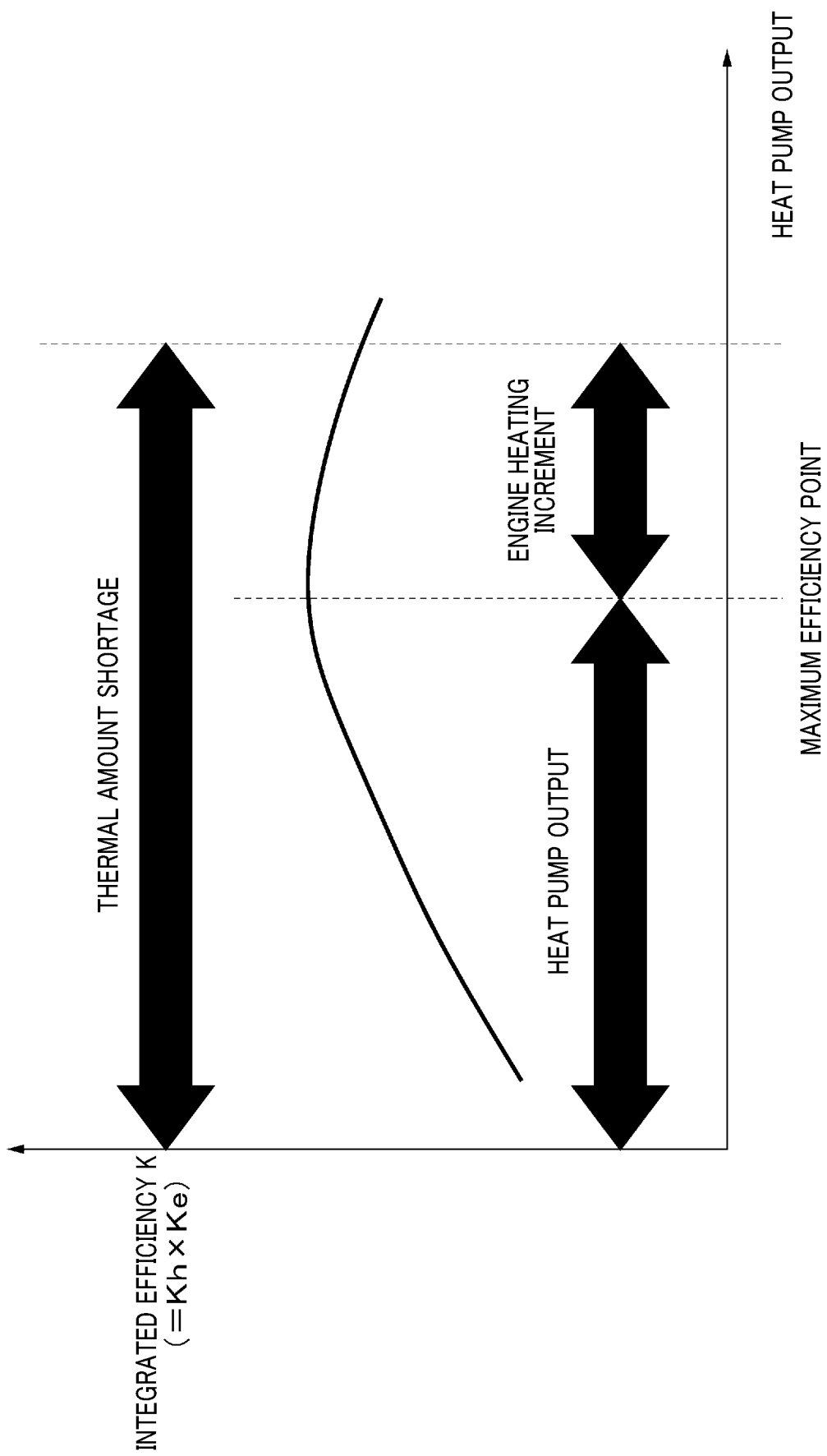
FIG. 12 is a graph for describing the method for calculating heat pump output and an engine heating increment.

As illustrated in FIG. 12, a combination of the output of the heat pump 26 and the engine heating increment with the highest integrated efficiency K is, by means of the characteristics of the current heat generation efficiency of the heat pump 26 and the characteristics of the current power generation efficiency of the engine 11, searched among combinations, which satisfy the above-described expression (A), of the output of the heat pump 26 and the engine heating increment. In this manner, the output of the heat pump 26 and the engine heating increment with the highest integrated efficiency K under the condition where the target heating thermal amount can be ensured are obtained.

Figure 13:
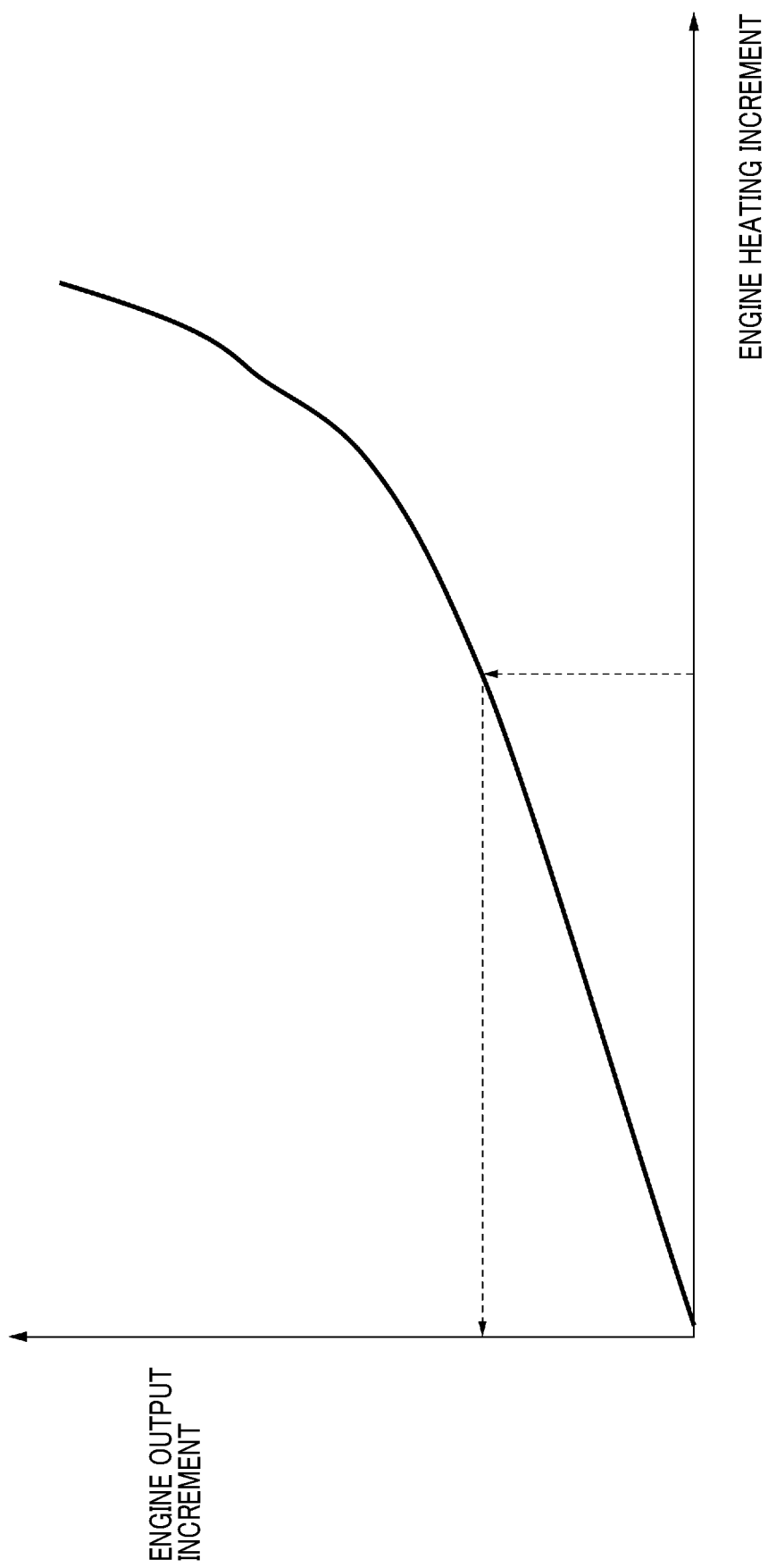
FIG. 13 is a conceptual graph of an example of a map of an engine output increment.

Thereafter, the processing proceeds to step 309, and an output increment of the engine 11 is calculated by, e.g., a map or a mathematical expression according to the engine heating increment. As illustrated in FIG. 13, the map, the mathematical expression, etc. for the output increment of the engine 11 is set such that a greater engine heating increment results in a greater output increment of the engine 11. The output increment of the engine 11 is added to base output of the engine 11 to obtain the output of the engine 11. In this manner, the output of the heat pump 26 and the output of the engine 11 with the highest integrated efficiency K under the condition where the target heating thermal amount can be ensured are obtained.

Thereafter, the processing proceeds to step 310, and it is determined whether or not the SOC of the high-voltage battery 18 is equal to or less than a predetermined value. At step 310, in a case where it is determined that the SOC of the high-voltage battery 18 is equal to or less than the predetermined value, the processing proceeds to step 311, and the output of the heat pump 26 set at the above-described step 308 and the output of the engine 11 set at the above-described step 309 are directly employed without correction. Thereafter, the processing proceeds to step 313, and the power generation amount of the power generator 17 is increased by an amount corresponding to the output increment of the engine 11 set at the above-described step 309.

On the other hand, in a case where it is, at the above-described step 310, determined that the SOC of the high-voltage battery 18 is greater than the predetermined value, the processing proceeds to step 312. At step 312, the output increment of the engine 11 set at the above-described step 309 is decrease-corrected, and the output of the engine 11 is decrease-corrected. Moreover, the output of the heat pump 26 set at the above-described step 308 is increase-corrected. Thereafter, the processing proceeds to step 313, and the power generation amount of the power generator 17 is increased by the amount corresponding to the output increment of the engine 11 subjected to decrease correction at the above-described step 312.

In the third embodiment described above, the characteristics of the heat generation efficiency of the heat pump 26 and the characteristics of the power generation efficiency of the engine 11 are, upon executing the heating thermal amount control, set based on the engine outlet water temperature etc. Then, based on the characteristics of the heat generation efficiency of the heat pump 26 and the characteristics of the power generation efficiency of the engine 11, the output of the heat pump 26 and the output of the engine 11 are set such that the integrated efficiency K is highest under the condition where the target heating thermal amount can be ensured. In this manner, the heat pump 26 and the engine 11 can also cooperate with each other to improve fuel economy while the target heating thermal amount is ensured. In addition, the integrated efficiency of the heat generation efficiency of the heat pump 26 and the power generation efficiency of the engine 11 can be set highest, and therefore, the fuel economy can be more effectively improved.

Figure 14:
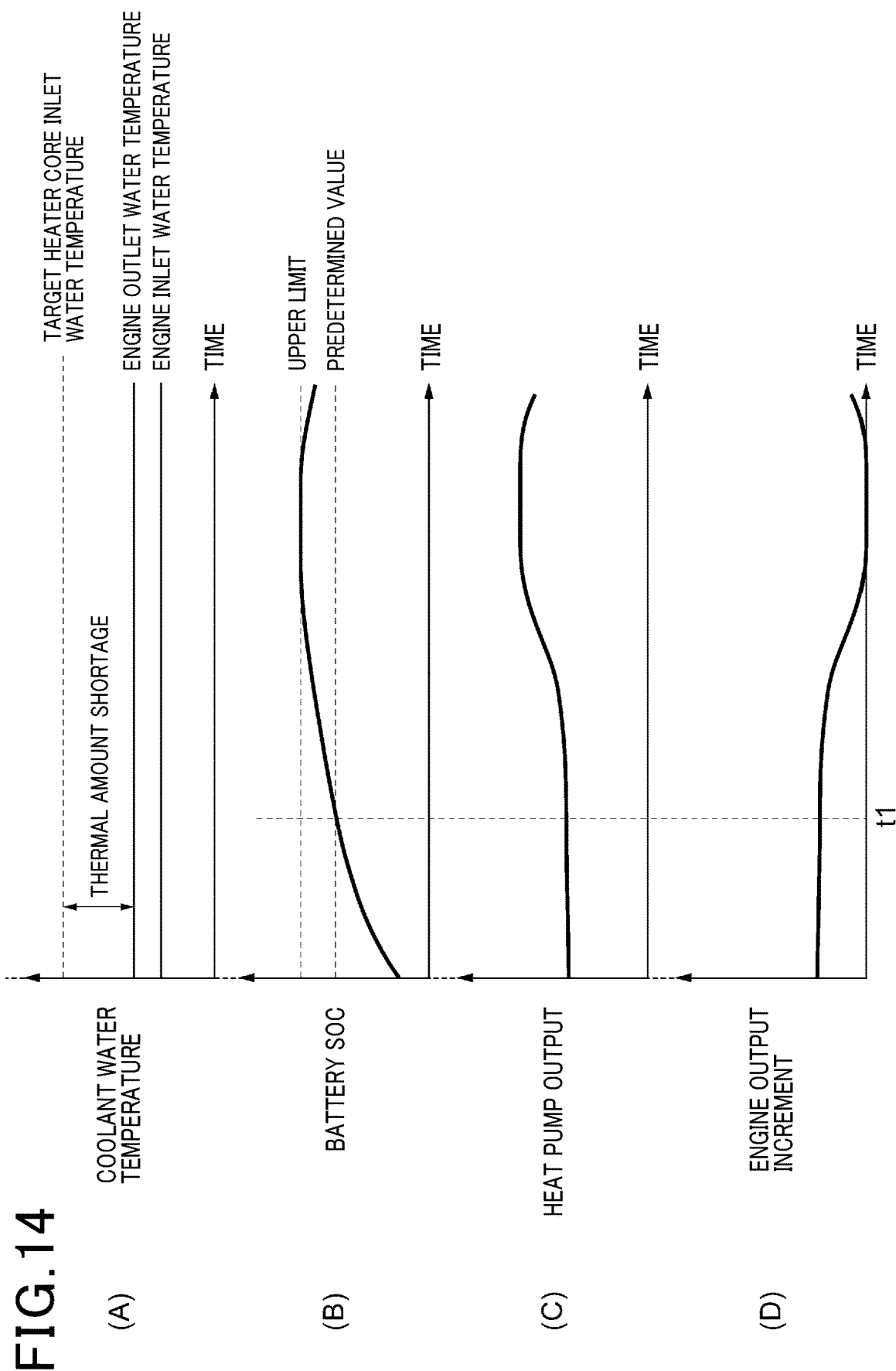
FIG. 14 is a time chart of an implementation example of heating thermal amount control of the third embodiment.

An implementation example of the heating thermal amount control of the third embodiment will be described with reference to FIG. 14. (A) of FIG. 14 illustrates the coolant water temperature. (B) of FIG. 14 illustrates the battery SOC. (C) of FIG. 14 illustrates the heat pump output. (D) of FIG. 14 illustrates the engine output increment. Note that FIG. 14 illustrates a case where the required heating load is constant and the required travelling load+the required power generation load is constant. Moreover, the engine outlet water temperature in FIG. 14 indicates a water temperature in a case where the output of the engine 11 is not increased by the heating thermal amount control. The case where the output of the engine 11 is not increased by the heating thermal amount control is the case of not including the engine heating increment.

In the heating thermal amount control of the third embodiment, the output of the heat pump 26 and the output of the engine 11 with the highest integrated efficiency K under the condition where the target heating thermal amount can be ensured are obtained. As illustrated in FIG. 14, when the SOC of the high-voltage battery 18 is equal to or less than the predetermined value, the output of the heat pump 26 and the output of the engine 11 with the highest integrated efficiency K are directly employed. In this manner, the fuel economy is effectively improved while the target heating thermal amount is ensured.

Thereafter, in a case where the SOC of the high-voltage battery 18 exceeds the predetermined value, correction according to the SOC of the high-voltage battery 18 begins at such a time point t1 to decrease-correct the output increment of the engine 11 and decrease-correct the output of the engine 11. Moreover, the output of the heat pump 26 is increase-corrected. Thus, the power generation amount of the power generator 17 is decreased. This suppresses the SOC of the high-voltage battery 18 from reaching the upper limit while the target heating thermal amount is ensured.

Note that in each of the above-described embodiments, the power generation amount of the power generator 17 is increased by the amount corresponding to the output increment of the engine 11 by the heating thermal amount control. However, the present disclosure is not limited to such a configuration, and an output torque of the MG 12 may be decreased by the amount corresponding to the output increment of the engine 11 by the heating thermal amount control. A power generation amount of the MG 12 may be increased by the amount corresponding to the output increment of the engine 11 by the heating thermal amount control. Moreover, the processing of correcting the output of the heat pump 26 and the output of the engine 11 according to the SOC of the high-voltage battery 18 during execution of the heating thermal amount control may be omitted.

Moreover, in the above-described embodiments, the hybrid ECU 39 executes the heating thermal amount control routine. However, the present disclosure is not limited to such a configuration, and the heating thermal amount control routine may be executed by other ECUs than the hybrid ECU 39. For example, the heating thermal amount control routine may be executed by at least one of the engine ECU 40, the MG-ECU 41, the air-conditioning ECU 42, etc. Alternatively, the heating thermal amount control routine may be executed by both of the hybrid ECU 39 and another ECU.

Further, in the above-described embodiments, some or all of the functions executed by the ECU may be configured as hardware by one or more ICs etc.

In addition, the present disclosure is not limited to the vehicle with the configuration illustrated in FIG. 1, and can be implemented and applied to vehicles having various configurations with heat pumps each configured to heat coolant water of an engine as a vehicle power source.

The present embodiments have been described above with reference to the specific examples. However, the present disclosure is not limited to these specific examples. As long as the features of the present disclosure are provided, the scope of the present disclosure includes the specific examples to which design changes are made as necessary by those skilled in the art. Each element, arrangement, condition, shape etc. of each specific example described above are not limited to those described by way of example, and can be changed as necessary. For each element included in each specific example described above, a combination can be changed as necessary as long as no technical inconsistency is caused.

The invention claimed is:

1. An air-conditioner for a vehicle comprising:
   a coolant water circuit configured such that coolant water of an engine, which is a vehicle drive source, circulates between the engine and a heat pump configured to heat the coolant water;
   a water temperature sensor configured to detect a temperature of the coolant water flowing in the coolant water circuit; and
   an output controller configured to execute thermal amount control of setting, according to a coolant water temperature as the temperature of the coolant water detected by the water temperature sensor, output of the heat pump and output of the engine to ensure a predetermined target thermal amount;

wherein the output controller performs, as the thermal amount control, control of decreasing the output of the heat pump and increasing the output of the engine with an increase in the coolant water temperature to ensure the target thermal amount.

2. The air-conditioner for the vehicle according to claim 1, wherein the output controller performs, as the thermal amount control, control of setting the output of the heat pump to a value within a predetermined range set according to the coolant water temperature, thereby setting the output of the engine such that the target thermal amount is ensured at the set output of the heat pump.

3. The air-conditioner for the vehicle according to claim 1, further comprising:

a power generator to be driven by power of the engine, wherein the output controller increases a power generation amount of the power generator by an amount corresponding to an output increment of the engine by the thermal amount control.

4. The air-conditioner for the vehicle according to claim 1, further comprising:

a power generator to be driven by power of the engine, wherein the output controller performs, as the thermal amount control, control of setting a characteristic of a heat generation efficiency as a percentage of a coolant water heating amount with respect to consumed energy of the heat pump based on the coolant water temperature and setting a characteristic of a power generation efficiency as a percentage of a power generation amount of the power generator with respect to a consumed fuel amount of the engine, thereby setting the output of the heat pump and the output of the engine such that an integrated efficiency of the heat generation efficiency of the heat pump and the power generation efficiency of the engine is highest under a condition where the target thermal amount can be ensured.

5. The air-conditioner for the vehicle according to claim 3, further comprising:

a battery to be charged with power generated by the power generator, wherein the output controller corrects the output of the heat pump and the output of the engine according to a remaining capacity of the battery during execution of the thermal amount control.

* * * * *